(12) United States Patent
Cottevieille et al.

(10) Patent No.: US 6,292,080 B1
(45) Date of Patent: Sep. 18, 2001

(54) ELECTRIC TRANSFORMER HAVING SUPERCONDUCTIVE COILS

(75) Inventors: Christian Cottevieille, Montreuil; Thierry Verhaege, Saulx les Chartreux, both of (FR)

(73) Assignee: Alstom France S.A., Paris (FR)

( * ) Notice: Subject to any disclaimer, the term of this patent is extended or adjusted under 35 U.S.C. 154(b) by 0 days.

(21) Appl. No.: 09/398,763

(22) Filed: Sep. 17, 1999

(30) Foreign Application Priority Data

Sep. 18, 1998 (FR) .................................................. 98 11677

(51) Int. Cl.$^7$ ................. H01F 7/22; H05F 3/00
(52) U.S. Cl. ...................... 336/DIG. 1; 361/219
(58) Field of Search .................. 336/DIG. 1; 335/216; 361/219

(56) References Cited

U.S. PATENT DOCUMENTS

| | | | |
|---|---|---|---|
| 5,379,020 | * | 1/1995 | Meier et al. ............................ 5/213 |
| 5,912,607 | * | 6/1999 | Kalsi et al. ........................... 335/216 |

FOREIGN PATENT DOCUMENTS

| | | |
|---|---|---|
| 4418050A1 | 1/1995 | (DE) . |
| 0 081 854 A | 11/1980 | (EP) . |
| 0 154 779 A1 | 9/1985 | (EP) . |
| 2 321 137 A | 7/1998 | (GB) . |

OTHER PUBLICATIONS

F. Van Overbeeke et al "Design and Operation of a Protection System for Transformers with Superconducting Windings", CRYOGENICS, vol. 25, No. 12, Dec. 1985, pp. 687–694, XP002104440.

* cited by examiner

Primary Examiner—Anh Mai
(74) Attorney, Agent, or Firm—Sughrue, Mion, Zinn, Macpeak & Seas, PLLC

(57) ABSTRACT

An electric transformer comprising a primary coil and a secondary coil each constituted by at least a first coil formed by winding one or more metal-matrix superconductive conductors. The first coil of the primary coil or of the secondary coil is connected in series with at least one second coil formed by a solid superconductive tube machined to form a solenoid, the second coil being disposed coaxially with the first coil. This design contributes to protecting the transformer by means of its current-limiting effect.

2 Claims, 3 Drawing Sheets

FIG_1
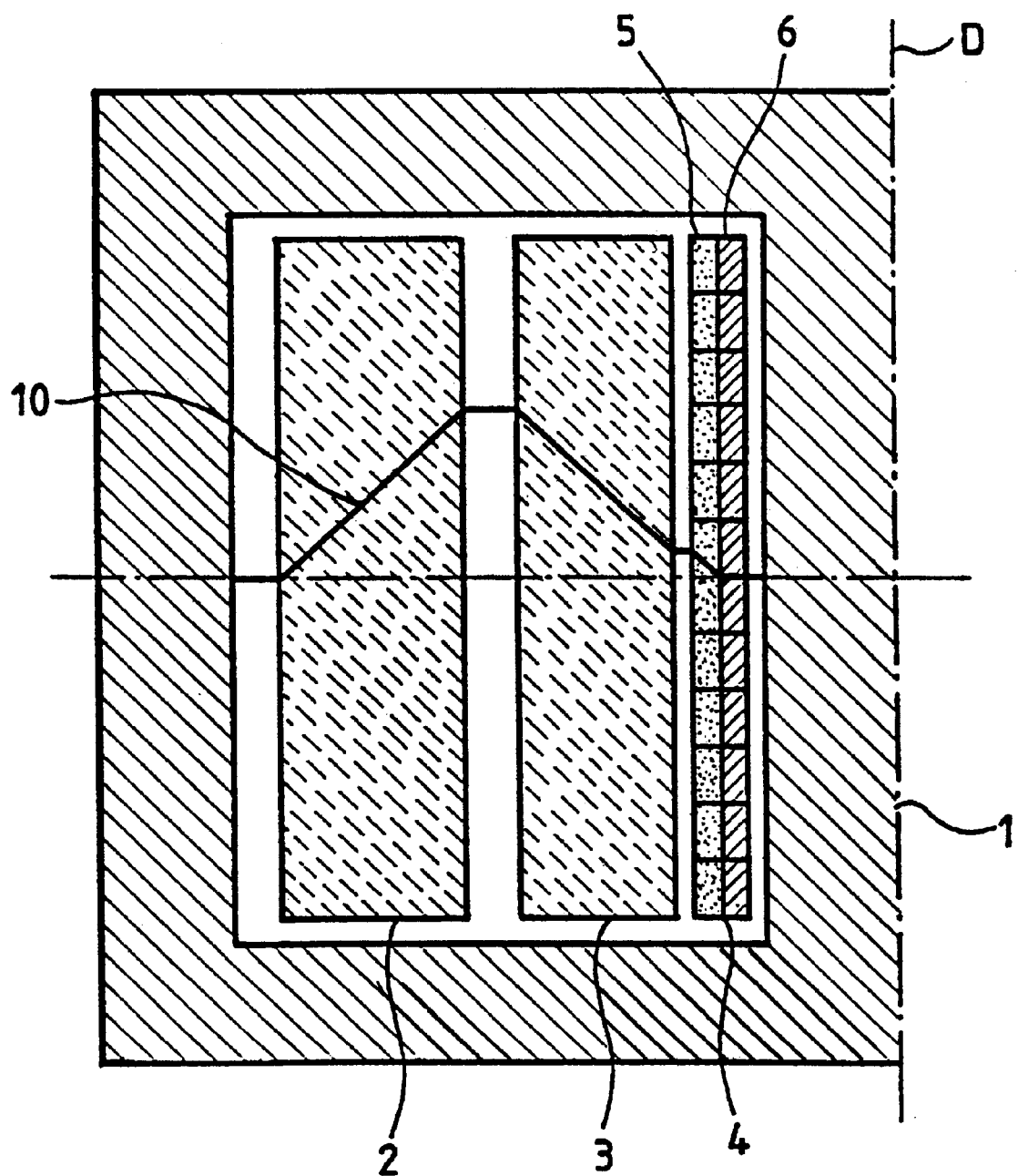

FIG_2
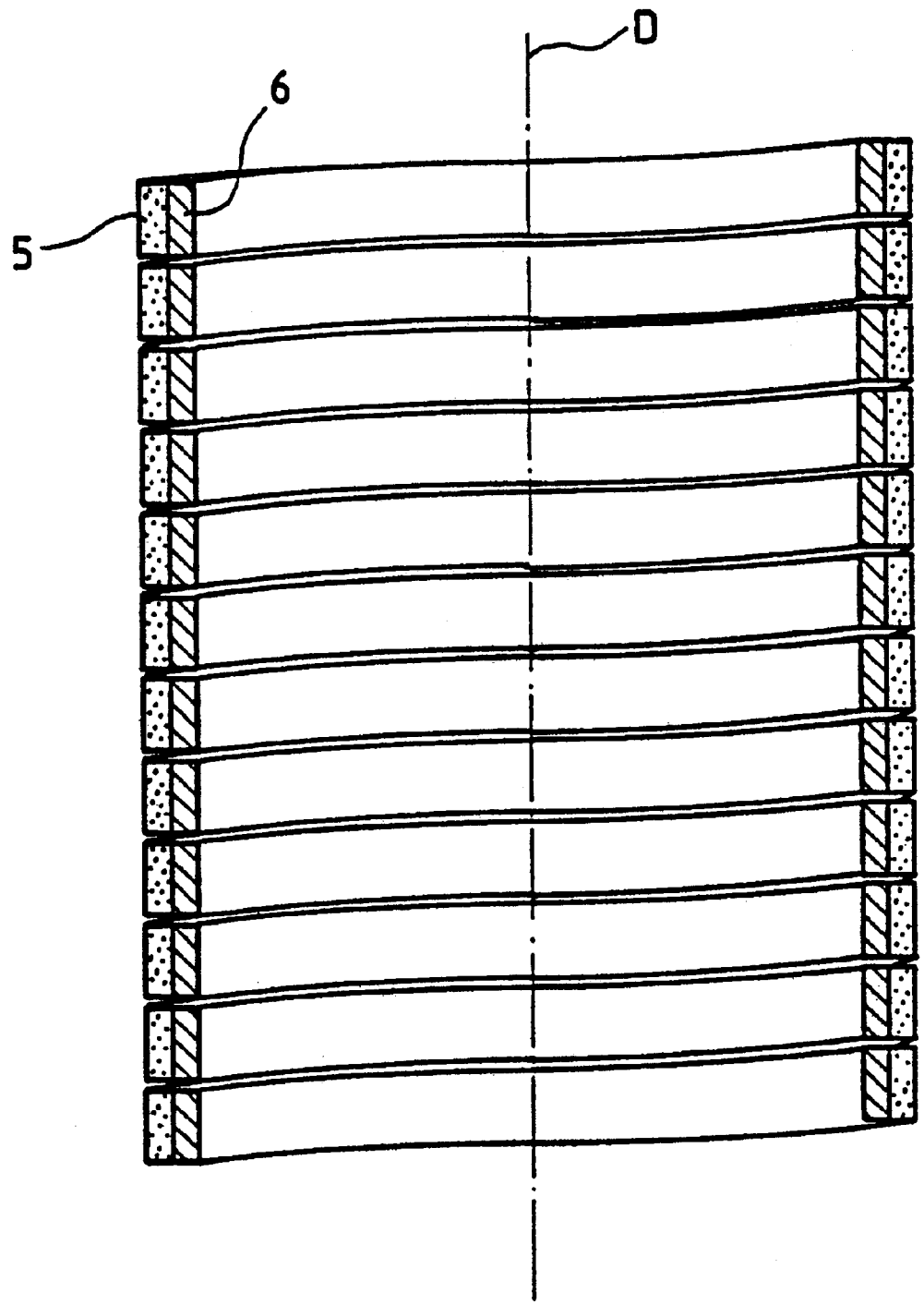

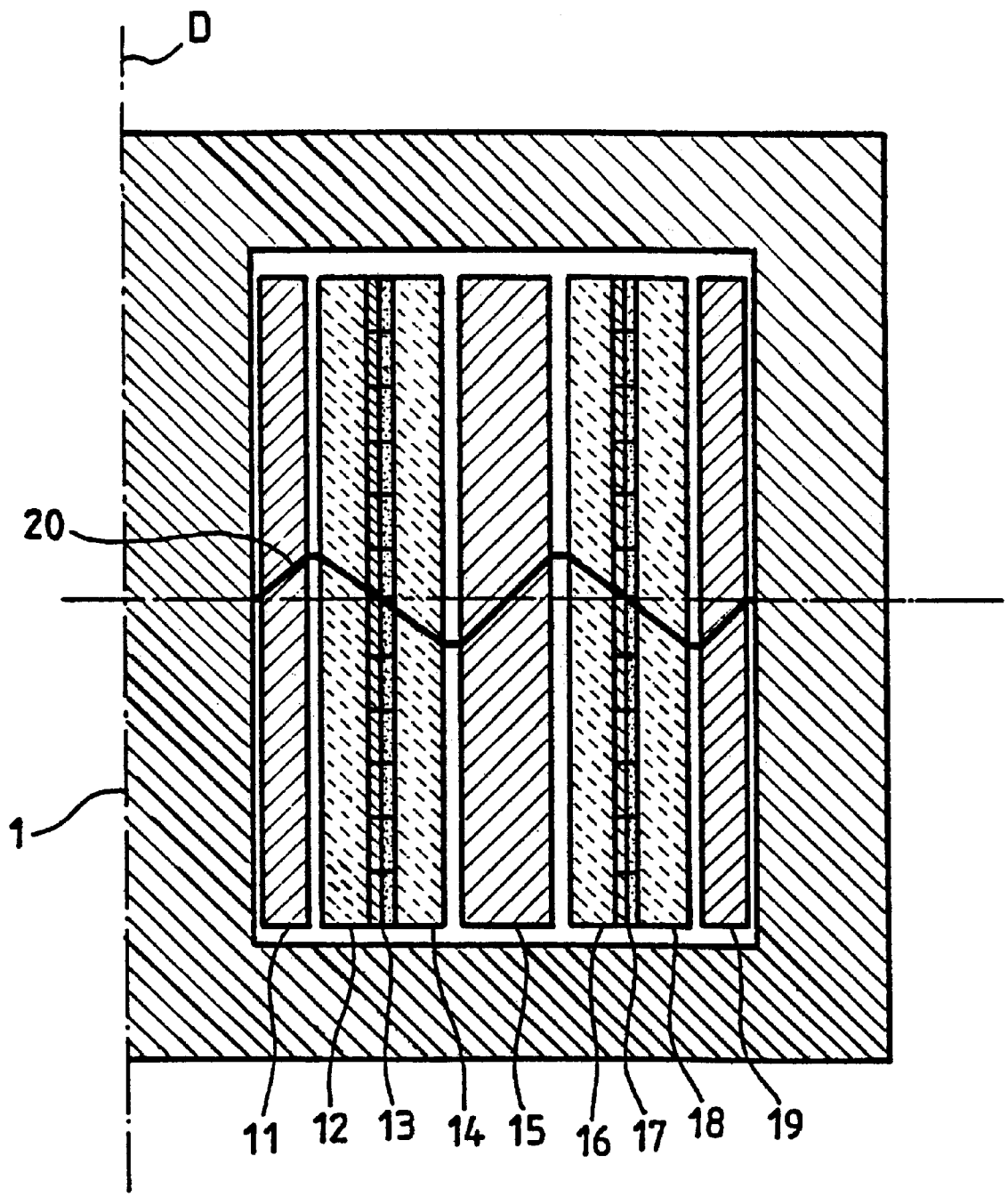
FIG_3

ELECTRIC TRANSFORMER HAVING SUPERCONDUCTIVE COILS

The invention relates to an electric transformer having superconductive coils at the primary coil and/or secondary coil.

BACKGROUND OF THE INVENTION

In the conventional manner, metal-matrix superconductive conductors are used to make electric transformers presenting high power per unit mass and high efficiency. Metal-matrix superconductive conductors make it possible to obtain current densities that are much higher and losses that are much lower than can be obtained with solid superconductors or with non-superconductive conductors.

Nevertheless, the low electrical resistance of the metal matrix (e.g., made of silver or silver alloy) does not make it possible to limit short-circuit currents effectively, so it is necessary to define the transformer and the other electrical equipment present on the line in such a manner as to enable them to withstand high short-circuit currents, or else to add in series apparatus that is dedicated to limiting current. In the conventional manner, such apparatus can be made using solid superconductors that present high electrical resistance when the currents exceed their normal capacities.

OBJECTS AND SUMMARY OF THE INVENTION

The object of the invention is to combine the transformer and current limiter functions in a single device and to do so under good conditions, in particular concerning overall size.

The idea on which the invention is based is to use a quantity of solid superconductor that is just sufficient to limit the current and to make it contribute to creating ampere-turns, taking care to locate it in regions of the transformer where the magnetic field is weakest, with this particular disposition making it possible to achieve a considerable reduction in the losses from the solid superconductor.

More particularly, the invention provides an electric transformer comprising a primary coil and a secondary coil each constituted by at least a first coil formed by winding one or more metal-matrix superconductive conductors, wherein the first coil of the primary coil or of the secondary coil is connected in series with at least one second coil formed by a solid superconductive tube machined to form a solenoid, said second coil being disposed coaxially with said first coil and having a current-limiting function.

With the transformer design of the invention, the volume of the machined superconductive tubes is kept down to the minimum necessary for limiting short-circuit currents effectively, while metal-matrix superconductive conductors are used for the remainder of the coils.

In a first advantage of the invention, the machined superconductive tube(s) can be located in the primary coil for a voltage-raising transformer or in the secondary coil for a voltage-lowering transformer. They thus operate at high current and at low voltage, i.e., large sectional area and small number of turns, which is more appropriate to this type of coil, and also reduces dielectric problems while limiting current.

In a particular embodiment of the transformer of the invention, the machined superconductive tube(s) is/are located in regions of the transformer where the magnetic field is weakest, which has the useful consequence of considerably reducing loses therein, and of increasing the current density they can carry.

Preferably, each superconductive tube is in mechanical and electrical contact with a tube made of a highly resistive metal alloy, the assembly being machined into the form of a solenoid; in addition to providing mechanical reinforcement, the metal alloy tube favors the propagation of the transition and reduces the heating of the superconductive tube while current limitation is taking place.

BRIEF DESCRIPTION OF THE DRAWINGS

Other characteristics and advantages of the invention will appear on reading the description of two embodiments that are shown in the drawings.

FIG. 1 is an axial half-section on an axis D showing a transformer of the invention comprising a high voltage primary coil based on metal-matrix superconductive conductors, and a secondary coil comprising a coil based on metal-matrix superconductive conductors in series with the machined assembly of a superconductive tube and of a metal alloy tube.

FIG. 2 is a longitudinal section showing the machined assembly of the superconductive tube and the metal alloy tube in detail.

FIG. 3 is an axial half-section on the axis D showing another example of a transformer of the invention.

MORE DETAILED DESCRIPTION

As shown in FIG. 1, a transformer of the invention comprises in particular a magnetic circuit 1, a primary coil 2, and two secondary coils 3 and 4 in series. The coils 2, 3, and 4 are coaxial, with the coil 3 being interposed between the coils 2 and 4.

The coils 2 and 3 are made as multilayer solenoids, starting from windings of one or more metal-matrix superconductive conductors; by way of example, they may be tapes of silver containing a plurality of filaments of $Bi_2Sr_2CaCu_2O_7$ superconductive ceramic. These tapes accept current densities of the order of 30 $A/mm^2$, which are high in comparison with the 5 $A/mm^2$ to 10 $A/mm^2$ for solid tubes of $Bi_2Sr_2CaCu_2O_7$. They are of very small thickness (typically 0.2 mm), thereby making it possible to reduce losses therefrom greatly, as compared with losses from solid tubes which are several millimeters thick.

The coil 4 is made from a solid tube 5 of $Bi_2Sr_2CaCu_2O_7$, plus a tube 6 of a metal alloy (e.g., a stainless steel, cupronickel, or inconel), that are machined together so as to take the form of a solenoid as shown in FIG. 2. By way of example, the tube 5 can be crimped around the tube 6 by expanding or contracting one or the other so that, after machining, electrical and mechanical contact is provided turn against turn such that when the tube 5 behaves as a current limiter, some of the current is conveyed by the tube 6. On losing the superconductive state, solid $Bi_2Sr_2CaCu_2O_7$ presents high electrical resistivity (about $10^{-5}$ $\Omega.m$), thereby predisposing it to the current-limiting function. This limitation can be obtained providing a large enough fraction of the coils (typically 10%) is made from solid $Bi_2Sr_2CaCu_2O_7$. By reducing the Joule effect, by increasing thermal inertia, and by promoting propagation of a transition, the presence of a coaxial metal alloy tube 6 in parallel with the tube 5 and in electrical and mechanical contact therewith, makes it possible to avoid the superconductor being damaged by overheating in the event of a localized loss of the superconductive state.

Given that current limitation requires only a small fraction of solid superconductor, it is possible in a first advantage of the invention to locate the machined superconductive tubes in the primary for a voltage-raising transformer or in the secondary for a voltage-lowering transformer, as is the case of the transformer shown in FIG. 1. The tubes then operate under high current and low voltage, i.e., they are of large section and they have a small number of turns; this is more suitable for this type of coil, and it also reduces dielectric problems while current limitation is taking place.

The machined superconductive tubes are preferably located in regions of the transformer where the magnetic field is weakest, having the advantages of obtaining a considerable reduction in losses therefrom, and a significant increase in the current density they can accept. The profile of the magnetic field within the coils is known to the person skilled in the art; it is represented by the line 10 in FIG. 1, in arbitrary units. The magnetic field is at a maximum between the coils 2 and 3, and practically zero at the outer and inner boundaries of the coil zone. Because of its extreme position, the machined superconductive tube 5 is exposed in this case to a magnetic field that is very weak, and therefore presents small losses.

Clearly the invention is not limited to the geometry shown by way of example in FIG. 1. In general, the person skilled in the art will have no difficultly in establishing the regions in the transformer where the magnetic field cancels so as to locate the machined superconductive tubes therein. One of the possible variants of the transformer of the invention is shown in FIG. 3.

FIG. 3 shows a current-lowering transformer which comprises nine coaxial coils referenced 11 to 19 in succession, from the inside towards the outside relative to its axis D. The coils 11, 15, and 19 form part of the primary, and the coils 12 to 14 and 16 to 18 form part of the secondary. The coils 12 to 14 are connected in series as are the coils 16 to 18. The coils 13 and 17 are superconductive tubes machined to be solenoid-shaped, and lined with metal alloy tubes likewise machined to be solenoid-shaped; the other coils are constituted by metal-matrix superconductive conductors. The magnetic field profile is represented in arbitrary units by the line 20: it cancels halfway through the thickness of the two machined superconductive tubes 13 and 17, which therefore have very small losses.

The organization of the transformer of the invention thus provides numerous advantages compared with merely juxtaposing a current limiter and a transformer having superconductive coils. By protecting the transformer against short-circuit currents by means of machined solid superconductive tubes that contribute to producing ampere-turns, cost is greatly reduced compared with a transformer that is externally associated with a current limiter. Conversely, the specific structure of the transformer of the invention makes it possible to install the machined solid superconductive tubes required for current limitation in regions of low magnetic field, i.e. regions where the tubes provide their best performance. Finally, active and reactive losses are reduced, as are cryogenic requirements.

What is claimed is:

1. An electric transformer comprising a primary coil and a secondary coil each constituted by at least a first coil formed by winding one or more metal-matrix superconductive conductors, wherein said first coil of at least one of the primary and the secondary coil is connected in series with at least one second coil disposed coaxially with said first coil and formed by a solid superconductive tube, said superconductive tube being in electrical and mechanical contact with a highly resistive metal alloy tube disposed coaxially therewith, both tubes being machined to form a solenoid.

2. The transformer of claim 1, wherein said at least one second coil is disposed between two coils and is connected in series with the two coils, the two coils both belonging to one of the primary coil and the secondary coil.

* * * * *